April 20, 1948. T. BROWN 2,439,921
RESILIENTLY MOUNTED CULTIVATOR TOOL
Filed April 7, 1944
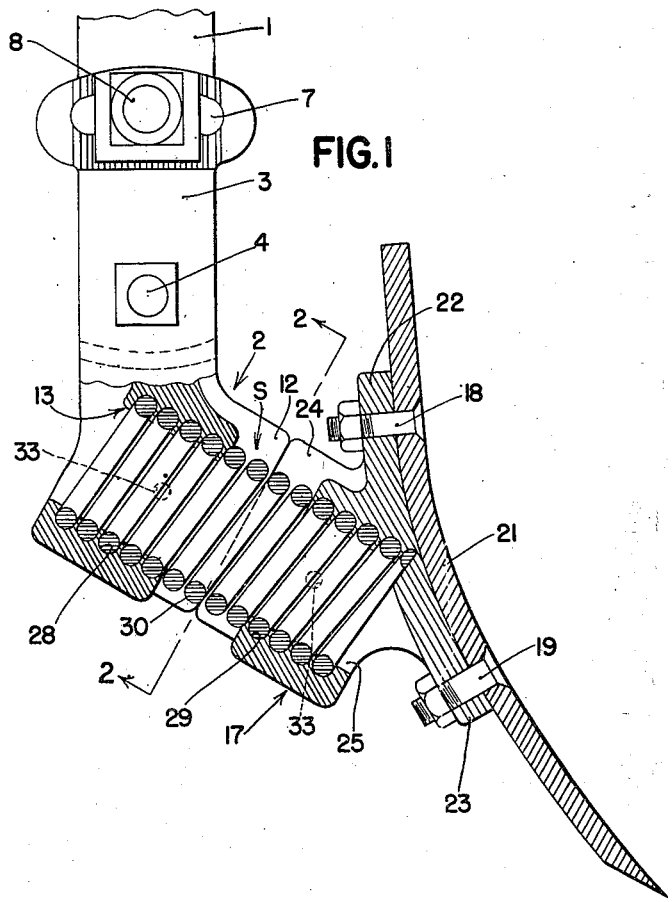
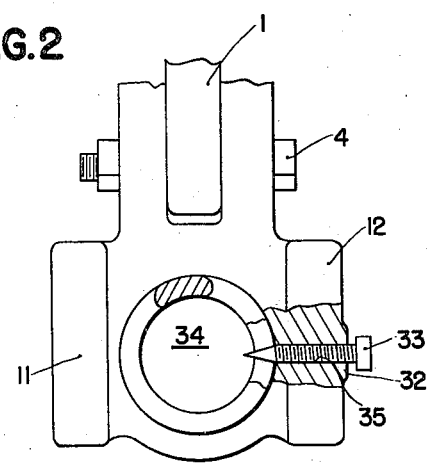
WITNESS
E. B. BJURSTROM
INVENTOR.
THEOPHILUS BROWN
ATTORNEYS Patented Apr. 20, 1948

2,439,921

UNITED STATES PATENT OFFICE 2,439,921

RESILIENTLY MOUNTED CULTIVATOR TOOL

Theophilus Brown, Moline, Ill., assignor to Deere & Company, Moline, Ill., a corporation of Illinois Application April 7, 1944, Serial No. 530,017

3 Claims. (Cl. 97—184)

The present invention relates generally to agricultural implements and more particularly to cultivators.

The object and general nature of the present invention is the provision of an improved mounting for cultivator shovels in which the construction is simplified and the cost of manufacture appreciably reduced, and it is a further feature of this invention to provide an improved cultivator shovel mounting in which the effect of a spring release trip is secured but without any extraneous moving parts. More specifically, it is a feature of this invention to provide a coil spring member as the sole connection between a cultivator shovel and the supporting shank therefor. It is an additional feature of this invention to provide a coil spring connection between a shovel and its supporting shank, so arranged that the cultivator shovel will yield, as when encountering an obstruction, but otherwise is held by the coil spring firmly and rigidly in operating position.

These and other objects and advantages of the present invention will be apparent to those skilled in the art after a consideration of the following detailed description, taken in conjunction with the accompanying drawings.

In the drawings:

Figure 1 is a side view, with certain parts being shown in section, of a cultivator shovel mounting.

Figure 2 is a sectional view taken generally along the line 2—2 of Figure 1.

Referring now to the drawings, reference numeral 1 indicates the shank or supporting member of a cultivator, and pivotally secured to the lower end of the shank 1 is a foot piece 2 having a bifurcated section represented by arms 3 which are disposed on opposite sides of the lower end of the cultivator shank 1. A bolt 4 forms the pivot between these parts, and the upper end of each of the arm sections 3 is slotted, as at 7, and receives a clamping bolt 8 by which the position of the foot piece on the lower end of the shank 1 may be adjusted, as desired.

The foot piece 2 is provided with a pair of shoulders 11 and 12 disposed in laterally spaced apart relation, and between the shoulders 11 and 12 is a spring receiving socket 13. A bracket 17 is secured, as by bolts 18 and 19, to a shovel 21 of conventional construction, the bracket 17 having attaching flange sections 22 and 23 and a pair of shoulders 24 spaced apart and formed to butt against the shoulders 11 and 12 mentioned above. Between the shoulders 24 on the bracket 17 is a spring socket 25. The members 2 and 17 preferably are castings, and the spring sockets 13 and 25 thereof are formed by cores when the castings are made. Preferably, the spring receiving sockets 13 and 25 are provided with grooves 28 and 29, these being in the nature of screw threads and receiving the ends of a fairly rigid coil spring 30 in screw threaded relation. In order to secure the desired rigidity, a spring 30 of the pre-stressed type is employed. A spring of this type is well known in the art, usually being formed cold. In a pre-stressed spring, the initial tension is usually produced by partly overlapping the wire as it is fed into the coiling machine, and in this kind of a spring, a considerable load must be applied before the initial tension is overcome, after which further loads serve to elongate the spring. A spring of this type therefore possesses considerable initial resistance against buckling. A tapped boss 32 is formed on each of the members 2 and 17, and each boss is adapted to receive a set screw 33 having an inner pointed end 34. Each boss 32 has its threaded hole 35 disposed so as to position the pointed end of the associated set screw 33 in between two adjacent turns of the spring 30, as best shown in Figure 1, whereby tightening the two set screws 33 firmly fixes the opposite ends of the spring 30 in the sockets 13 and 25.

In assembling the device, the spring 30 may first be screwed into the socket 13, and then the bracket 17, with or without the shovel 21 attached thereto, may be screwed onto the other end of the spring 30 until the shoulders 11 and 12 register with and engage the shoulders 24. If desired, further tension may be put into the spring 30 by giving the bracket 17 the proper turn, after which the set screws 33 will be tightened. It will be observed from Figure 1 that the shoulders 11, 12 and 24 are of such height that there is a considerable space S in the central portion of the spring where it is unconnected with the associated sockets and therefore free to flex as may be necessary. Ordinarily, the spring 30 is of sufficient strength to hold the shovel 21 in position against all forces normally encountered. However, if the shovel 21 should strike a rock or other obstruction, the spring is free to flex within the space S so that the shovel can pass over the obstruction, after which the spring 30 will restore the shovel to its normal operating position.

It will be observed that by virtue of my invention a simple, sturdy and inexpensive shovel mounting for cultivators has been provided, and one in which without any moving parts, such as pivots, toggle springs and the like, the effect of a spring trip device is secured.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, a tool-supporting part having a downwardly and forwardly facing spring-receiving socket at the lower end of said part, a tool carrying part having an upwardly facing spring-receiving socket, a pair of downwardly and forwardly facing abutment shoulders on said tool-supporting part on opposite sides of the associated socket, a second pair of abutment shoulders facing upwardly and rearwardly and carried on said tool-carrying part on opposite sides of the associated socket and facing and contacting said first mentioned abutment shoulders, a spring member disposed in a downwardly and forwardly extending line and fixed at its rear end in the spring receiving socket of said supporting part and fixed at its forward end in the spring receiving socket in said tool-carrying part, said spring being disposed in a downwardly and forwardly extending line, and a tool fixed to said tool-carrying part and having a point positioned substantially in line with said spring forwardly and downwardly thereof.

2. In an agricultural implement, a tool-supporting part having a downwardly and forwardly facing spring-receiving socket at the lower end of said part, a tool carrying part having an upwardly facing spring-receiving socket, a spring member disposed in a downwardly and forwardly extending line and fixed at its rear end in the spring receiving socket of said supporting part and fixed at its forward end in the spring receiving socket in said tool-carrying part, said spring being disposed in a downwardly and forwardly extending line and having considerable initial resistance against buckling, and a tool fixed to said tool-carrying part and having a point positioned substantially in line with said spring forwardly and downwardly thereof.

3. In an agricultural implement, a tool-supporting part having a spring-receiving socket at the lower end of said part, a tool carrying part having a spring-receiving socket, a pair of forwardly facing abutment shoulders on said tool-supporting part on opposite sides of the associated socket, a second pair of abutment shoulders on said tool carrying part on opposite sides of the associated socket, said shoulders facing toward and contacting said first mentioned abutment shoulders on opposite sides of the associated socket, and a spring member fixed at one end in the spring receiving socket of said supporting part and fixed at its other end in the spring receiving socket in said tool-carrying part, and a tool fixed to said tool-carrying part and having a point positioned substantially in line with said spring.

THEOPHILUS BROWN.

REFERENCES CITED

The following references are of record in the file of this patent:

UNITED STATES PATENTS

| Number | Name | Date |
| --- | --- | --- |
| 234,321 | Nellis | Nov. 9, 1880 |
| 1,013,410 | Lynch | Jan. 2, 1912 |
| 1,838,355 | Benjamin | Dec. 29, 1931 |
| 2,358,531 | Orendorff | Sept. 19, 1944 |

FOREIGN PATENTS

| Number | Country | Date |
| --- | --- | --- |
| 26,343 | Great Britain | 1912 |